United States Patent Office 3,459,712
Patented Aug. 5, 1969

3,459,712
ISOCYANURATE ELASTOMERS BASED ON FATTY DIMER DIISOCYANATES AND IONIC POLYMERIZATION CATALYSTS
John Mann Butler, Dayton, Ohio, assignor to Monsanto Research Corporation, St. Louis, Mo., a corporation of Delaware
No Drawing. Filed Dec. 30, 1966, Ser. No. 606,056
Int. Cl. C08g 22/20, 22/36
U.S. Cl. 260—77.5                                         4 Claims

ABSTRACT OF THE DISCLOSURE

An elastomeric polyisocyanurate product obtained from fatty dimer diisocyanates in the presence of an amine-alkylene oxide ionic polymerization catalyst.

---

This invention pertains to synthetic resins, and particularly to polymerized aliphatic diisocyanates.

It is well established that organic isocyanates may be polymerized to organic polymers. The formation of cyclic dimers and trimers from aryl isocyanates was demonstrated over 100 years ago by A. W. Hofmann in Jahresberichte über die Fortschritte der Chemie, (1858) page 349. The products are crystalline, sharply-melting solids. The trimerization of an aryl diisocyanate such as 2,4-tolylene diisocyanate in the presence of a triethylenediamine-cocatalyst combination was reported by Burton D. Beitchman in Industrial and Engineering Chemistry, Product Research and Development, vol. 5, page 35 (1966). The products are generally hard, rigid solids. Turning to aliphatic isocyanates, the formation of linear high molecular weight polymers by a low temperature homopolymerization of monoisocyanates in the presence of a basic catalyst was described by Victor E. Shashoua, Wilfred Sweeny and Raymond F. Tietz in the Journal of the American Chemical Society, vol. 82, page 866 (1960). The polymers in which the aliphatic group is n-octadecyl ($C_{18}$) are soluble in a variety of aromatic and chlorinated aliphatic solvents, and melt at about 94° C. Using trimethylene diisocyanates, William B. Black and Wesley L. Miller disclosed in U.S. Patent No. 3,163,624, a cyclic polymerization yielding a chain of six-membered cyclic ureas joined to each other by a carbonyl group. The polymers, although high-melting, are soluble in sulfuric acid, cresol, dimethylformamide, etc. In summary, apparently none of the prior art materials is an example of an essentially insoluble elastomer obtained by polymerization of an isocyanate.

This invention relates to nitrogenous elastomeric products and to the method of preparing them. More particularly, the invention provides new and valuable elastomers having high thermal stability, and cast objects obtained therefrom. The products described herein are obtained by heating a diisocyanate of the formula $$OCN-CH_2-R-CH_2-NCO$$

where R is the hydrocarbon portion of the dimer of a $C_{16}$-$C_{20}$ unsaturated aliphatic monocarboxylic acid, in the presence of a catalyst comprising a tertiary amine having from three to eight carbon atoms and an alkylene oxide having from two to eight carbon atoms.

Whereas prior art materials are generally high-melting crystalline solids, low-melting soluble linear polymers or hard, rigid crosslinked resins, the present products are infusible, flexible, elastomeric polymers. They have high thermal stability and hydrolytic stability. They are useful for gaskets, coatings or adhesives. They may be formed as coatings on or around a substrate, or may be cast in a mold. The products are generally of a resilient elastic nature suitable for shockproofing fragile articles. Furthermore, they have low dielectric constant and excellent electrical insulative properties. The polymers give essentially clear and bubble-free coatings, and castings.

The reactions which occur in the formulation of the polymer are not known with certainty. However, among the structures which may be postulated, we believe that the end product is a cross-linked polyisocyanurate having the following repeating unit:

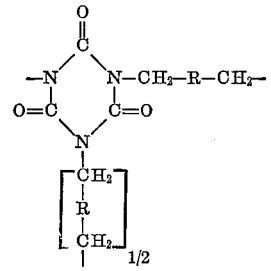

where R is as above defined.

The polymeric product of this invention is prepared from a commercially available diisocyanate derived from dimer acid (Chemical and Engineering News, Oct. 18, 1965, page 30). The dimer acids are well known in the art; see, e.g., U.S. Patent No. 2,482,761 to Goebel, 2,793,-219 to Barrett et al., and 2,955,121 to Myers et al., and the article by T. F. Bradley and W. B. Johnson, in Industrial and Engineering Chemistry, 32, 802 (1940). They may be represented by the following general formula:

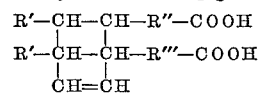

wherein R' is a monovalent aliphatic hydrocarbon radical containing 4 to 10 carbon atoms, and R'' and R''' are divalent aliphatic hydrocarbon radicals containing 4 to 10 carbon atoms. The dimer acids are prepared by reacting together two $C_{16}$ to $C_{20}$ olefinic aliphatic monocarboxylic acids, at least one of which contains polyolefinic unsaturations. The olefinic aliphatic monocarboxylic acids useful in the preparation of the dimer acids are palmitoleic, oleic, elaidic, vaccenic, hiragonic, linoleic, linolenic, linolenic, elaeostearic, parinaric, and arachidonic acids. The preferred acid is linoleic acid on the basis of cost and availability. It is well known that in the preparation of the dimer acids, higher polymeric acids are also formed, and that these, as well as unreacted mono acids, are separated from the desired dimer acids by processes of molecular distillation, etc. known in the art.

The diisocyanates used in the present invention may be derived from the above described dimer acids by processes which use well-known chemical reactions. For example, the diacid may be converted to a diamide, thence sequentially to a dinitrile, a diamine, and finally a diisocyanate as represented by the following steps:

$$R(COOH)_2 \rightarrow R(CONH_2)_2 \rightarrow R(CN)_2 \rightarrow$$
$$R(CH_2NH_2)_2 \rightarrow R(CH_2NCO)_2$$

where R is as above defined. For example, from linoleic acid there may be derived a diisocyanate of the formula:

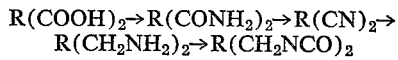

In the polymerization of the diisocyanate, according to the present invention, a tertiary amine and on olefin oxide function as cocatalysts. The concentration of catalyst is within the range of 0.01 to 5 parts of catalyst per 100 parts of diisocyanate. Various combinations of tertiary amine and olefin oxide may be employed, e.g., triethylenediamine and styrene oxide, pyridine and propylene oxide, etc. The tertiary amine and olefin oxide are advantageously employ in equal molar proportions but for the more reactive diisocyanates the amount of olefin oxide may be reduced.

Examples of the useful tertiary amines include triethylenediamine, triethylamine, tripropylamine, 1-methylpiperidine, 2-methylimidazole, N-methylmorpholine, pyridine, N,N,N',N'-tetramethyl-1,3-butanediamine, etc.

Examples of the useful olefin oxides include ethylene oxide, propylene oxide, butylene 1,2-oxide, styrene oxide, neohexane oxide, octylene, 1,2-oxide, glycidyl ethers, etc.

Generally the polymerization of the diisocyanate is an exothermic reaction in the presence of the catalyst. Thus, the reaction may be started at room temperature and allowed to warm up by the heat of reaction, or the reaction mixture may be heated at, say, 50° C. to 150° C. to hasten the polymerization. When the reaction is interrupted before the formation of the ultimate gelled product, a viscous liquid intermediate is obtained which can be used to impregnate fiber or fabrics for the production of heat-cured laminates or coated fabrics; subsequent curing completes the formation of the elastomeric polymeric product in situ.

To make less elastic, stiffer products, small proportions, say, 1–10% by weight, of short chain aliphatic diisocyanates, e.g., trimethylene, hexamethylene, etc., may be incorporated in the reaction mixture with the dimer acid diisocyanate and the cocatalysts.

Light weight stable foams may be made by incorporating pneumatogens in the reaction mixture, foaming the mixture, and thereafter curing to a tough rubbery foam at 50–150° C.

In forming gaskets, additives such as asbestos fibers may be incorporated in the reaction mixture. For coatings, pigments and opacifiers may be added.

The invention is further illustrated by, but not limited to, the following examples.

Example 1

A mixture of 3.0 g. of the diisocyanate derived from dimerized linoleic acid, as described above, 0.02 ml. of styrene oxide and 0.016 g. of triethylenediamine (1,4-diazabicyclo-2,2,2-octane) was heated in a nitrogen atmosphere at 100° C. for 48 hours. A small amount of liquid exudate was poured off, leaving an elastomeric product. Infrared spectrometric analysis of the product showed strong absorptions at 1430 and 1690 cm.$^{-1}$ characteristic of isocyanurate structure. The Vicat softening point of the elastomer, as determined by ASTM Method D1525–58 T (1964) using a 200 g. weight was −22° C. A thermogravimetric analysis showed 50% weight loss at 840° F. (450° C.) in helium.

Example 2

A mixture of 10 g. of the diisocyanate of Example 1, 0.1 g. of triethylenediamine and 0.1 g. of styrene oxide was heated in a closed tube at 90° C. for 3 hours, then at 100° C. for 19 hours. A rubbery product was obtained whose infrared spectrum showed only a trace of isocyanate starting material. The Vicat softening point of the product, as determined by ASTM Method D1525–58 T (1964) was −17° C.

It is to be understood that although the invention has been described with specific reference to particular embodiments thereof, it is not to be so limited since changes and alterations therein may be made which are within the full intended scope of this invention as defined by the appended claims.

What is claimed is:
1. An elastomeric polyisocyanurate product obtained by heating a diisocyanate of the formula

$$OCN-CH_2-R-CH_2-NCO$$

where R is the hydrocarbon portion of the dimer of a $C_{18}$ unsaturated aliphatic monocarboxylic acid, in the presence of a catalyst comprising a tertiary amine having from three to eight carbon atoms and an alkylene oxide having from two to eight carbon atoms.

2. The product of claim 1 further limited in that R is the hydrocarbon portion of the dimer of linoleic acid.

3. The product as obtained in claim 1, where the tertiary amine is triethylenediamine.

4. The product as obtained in claim 1, where the tertiary amine is triethylenediamine and the alkylene oxide is styrene oxide.

References Cited

UNITED STATES PATENTS

| 3,206,352 | 9/1965 | Gollis et al. | 161—93 |
| 3,211,703 | 10/1965 | Gilman et al. | 260—77.5 |

OTHER REFERENCES

General Mills Data Sheets CDS 8–65 (Sept. 29, 1965) and CDS 10–65 (Sept. 29, 1965), General Mills, Inc., Kankakee, Ill.

Saunders et al.: Polyurethanes, vol. I, Interscience (New York) 1962, pp. 94–97.

Phillips et al.: Polyurethanes, Illiffe Books (London), 1964, pp. 9–10, 91–92.

DONALD E. CZAJA, Primary Examiner

H. S. COCKERAM, Assistant Examiner

U.S. Cl. X.R.

117—161; 161—190; 260—2